(12) United States Patent
Izuhara et al.

(10) Patent No.: US 12,145,509 B2
(45) Date of Patent: Nov. 19, 2024

(54) SENSOR MOUNTING STRUCTURE FOR VEHICLE

(71) Applicant: TOYOTA JIDOSHA KABUSHIKI KAISHA, Toyota Aichi-ken (JP)

(72) Inventors: Tsuyoshi Izuhara, Toyota Aichi-ken (JP); Taro Hasegawa, Toyota Aichi-ken (JP); Tomoya Takeda, Toyota Aichi-ken (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 236 days.

(21) Appl. No.: 17/897,437

(22) Filed: Aug. 29, 2022

(65) Prior Publication Data

US 2023/0072056 A1 Mar. 9, 2023

(30) Foreign Application Priority Data

Sep. 6, 2021 (JP) ................................. 2021-144653

(51) Int. Cl.
*B60R 11/00* (2006.01)
(52) U.S. Cl.
CPC ......... *B60R 11/00* (2013.01); *B60R 2011/004* (2013.01); *B60R 2011/0052* (2013.01)
(58) Field of Classification Search
None
See application file for complete search history.

(56) References Cited

U.S. PATENT DOCUMENTS

| | | | |
|---|---|---|---|
| 10,099,630 B1* | 10/2018 | Krishnan | G01S 7/4813 |
| 2006/0113810 A1* | 6/2006 | Kuhl | B60R 11/02 |
| | | | 296/24.34 |
| 2015/0217700 A1* | 8/2015 | Flaherty | B60R 9/10 |
| | | | 224/570 |
| 2017/0066382 A1* | 3/2017 | Aftanas | B60Q 1/2692 |
| 2020/0023788 A1 | 1/2020 | Frederick et al. | |
| 2021/0302541 A1* | 9/2021 | Fields | H05K 7/14 |
| 2022/0075057 A1* | 3/2022 | Jones | G01S 17/86 |
| 2022/0089129 A1* | 3/2022 | Krishnan | B60R 11/04 |

FOREIGN PATENT DOCUMENTS

JP 2020-033002 A 3/2020

* cited by examiner

*Primary Examiner* — Steven M Marsh
(74) *Attorney, Agent, or Firm* — Dinsmore & Shohl LLP

(57) ABSTRACT

A sensor mounting structure for a vehicle, includes: first mounting members extending in a vehicle front-and-rear direction, being separated by a spacing in a vehicle width direction, and being mountable at arbitrary positions of a roof of the vehicle; and second mounting members extending in the vehicle width direction, being separated by a spacing in the vehicle front-and-rear direction, and being configured to span between arbitrary positions of the first mounting members, the second mounting members and the first mounting members retaining a sensor support member.

9 Claims, 5 Drawing Sheets

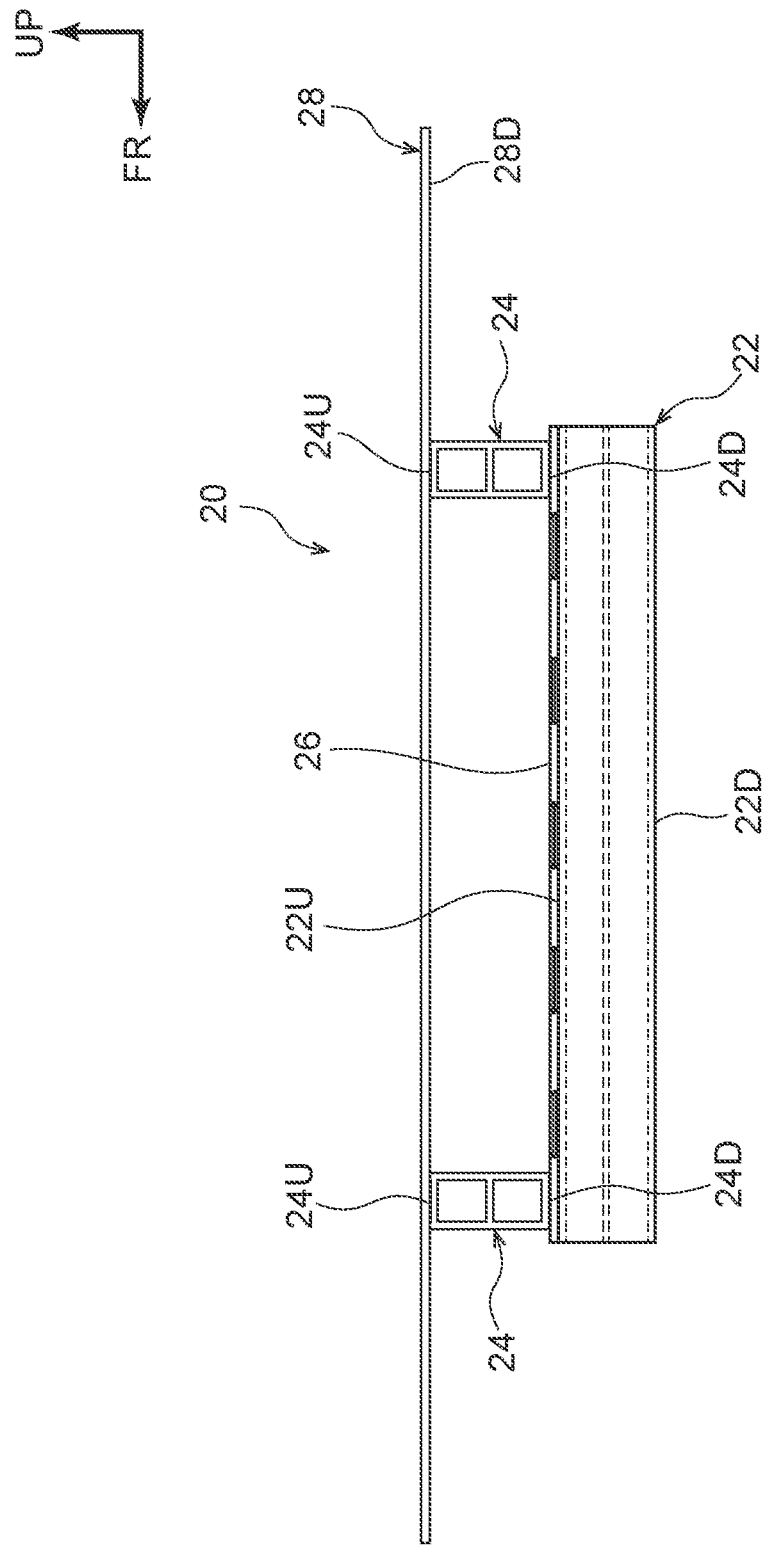

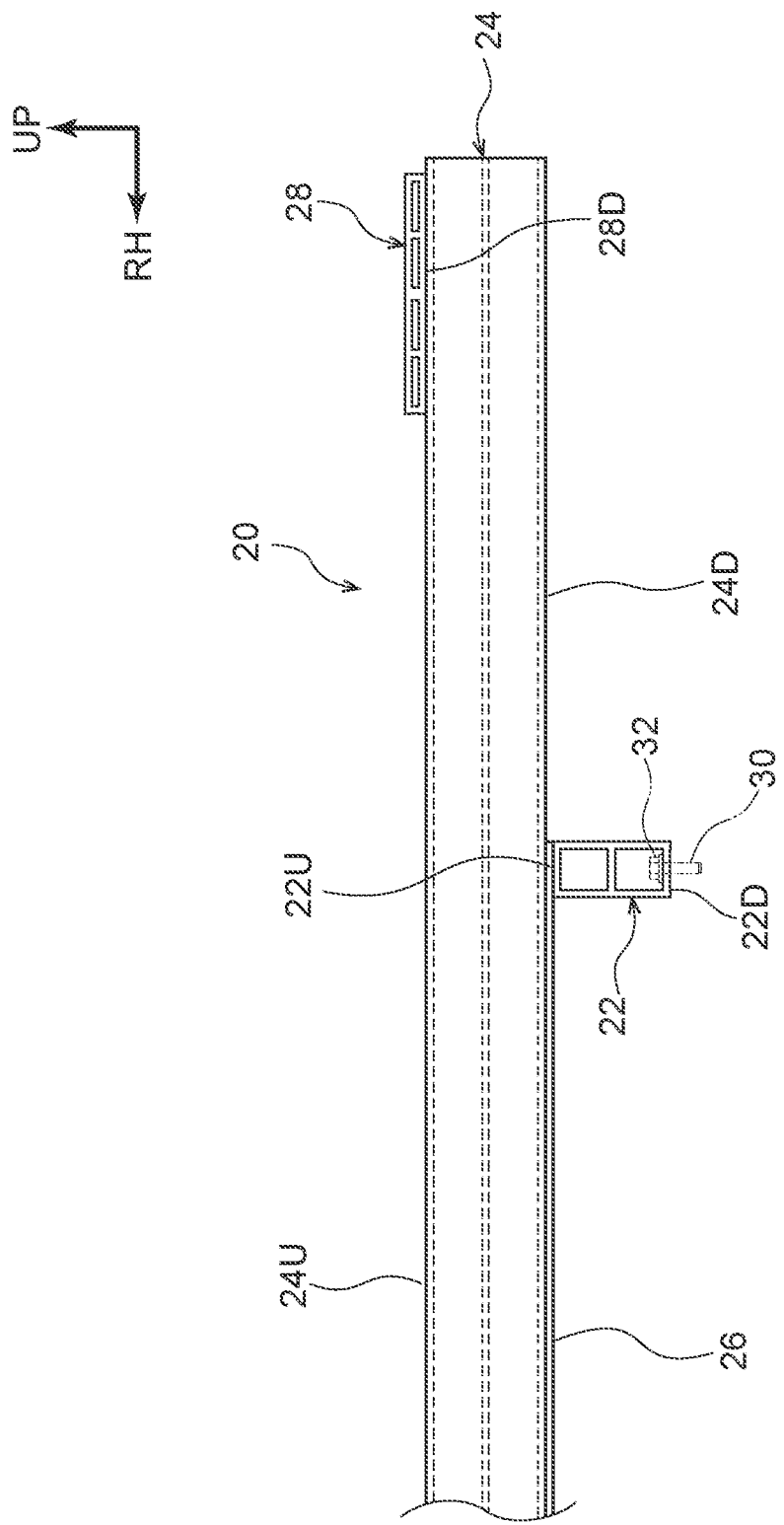

SENSOR MOUNTING STRUCTURE FOR VEHICLE

CROSS-REFERENCE TO RELATED APPLICATION

This application is based on and claims priority under 35 USC 119 from Japanese Patent Application No. 2021-144653 filed on Sep. 6, 2021, the disclosure of which is incorporated by reference herein.

BACKGROUND

Technical Field

The present disclosure relates to a sensor mounting structure for a vehicle.

Related Art

A structure for mounting a rear view sensor at the rear side of a roof of a vehicle has been known since heretofore (for example, see Japanese Patent Application Laid-Open (JP-A) No. 2020-033002).

However, the structure described above is a dedicated structure for mounting the sensor. Therefore, mounting the sensor may be troublesome when, for example, a vehicle model is changed. That is, when the size, shape or the like of the roof is changed, the sensor may not be mountable. Thus, there is scope for improvement in terms of improving versatility when a sensor is to be mounted at the roof of a vehicle.

SUMMARY

Accordingly, an object of the present disclosure is to provide a sensor mounting structure for a vehicle that may improve versatility when a sensor is to be mounted at the roof of a vehicle.

In order to achieve the object described above, a sensor mounting structure for a vehicle according to a first aspect of the present disclosure includes: first mounting members extending in a vehicle front-and-rear direction, being separated by a spacing in a vehicle width direction, and being mountable at arbitrary positions of a roof of the vehicle; and second mounting members extending in the vehicle width direction, being separated by a spacing in the vehicle front-and-rear direction, and being configured to span between arbitrary positions of the first mounting members, the second mounting members and the first mounting members retaining a sensor support member.

According to the first aspect of the present disclosure, the sensor support member is retained by the first mounting members and second mounting members. The first mounting members are spaced apart in the vehicle width direction and are configured to be mountable at arbitrary positions of the roof of the vehicle. The second mounting members are spaced apart in the vehicle front-and-rear direction and are configured to be capable of spanning between arbitrary positions of the first mounting members. Therefore, even if the size of the roof of the vehicle (the vehicle model) and the size of the sensor support member (sizes, quantity and the like of sensors) are changed, adaptation is possible by changing the spacing between the first mounting members and the spacing between the second mounting members. Thus, according to the present disclosure, versatility when a sensor is to be mounted at the roof of a vehicle is improved.

In a sensor mounting structure for a vehicle according to a second aspect of the present disclosure, in the sensor mounting structure for a vehicle according to the first aspect, the first mounting members and second mounting members have closed cross-section shapes.

According to the second aspect of the present disclosure, the first mounting members and second mounting members are formed in the closed cross-section shapes in cross section. Therefore, stiffness for retention of the sensor support member by the first mounting members and second mounting members is more assured than in a structure in which the first mounting members and second mounting members are not formed in closed cross-section shapes.

In a sensor mounting structure for a vehicle according to a third aspect, in the sensor mounting structure for a vehicle according to the first aspect or the second aspect, the sensor support member is formed in a rectangular flat plate shape, and a portion of the sensor support member is sandwiched by the first mounting members and second mounting members.

According to the third aspect of the present disclosure, the portions of the sensor support member that is formed in the rectangular flat plate shape are sandwiched between the first mounting members and the second mounting members. Thus, the sensor support member is securely retained by the first mounting members and second mounting members.

In a sensor mounting structure for a vehicle according to a fourth aspect, the sensor mounting structure for a vehicle according to any one of the first to third aspects further includes a sensor mounting member extending in the vehicle front-and-rear direction and spanning between vehicle width direction outer side end portions of the second mounting members.

According to the fourth aspect of the present disclosure, the sensor mounting member extending in the vehicle front-and-rear direction spans between the vehicle width direction outer side end portions of the second mounting members. Thus, adaptation is possible even if a quantity of sensors is increased.

In a sensor mounting structure for a vehicle according to a fifth aspect, in the sensor mounting structure for a vehicle according to the fourth aspect, the sensor mounting member has a closed cross-section shape.

According to the fifth aspect of the present disclosure, the sensor mounting member is formed in the closed cross-section shape in cross section. Therefore, stiffness for support of sensors by the sensor mounting member may be more assured than in a structure in which the sensor mounting member is not formed in a closed cross-section shape.

As described above, according to the present disclosure, versatility when a sensor is to be mounted at the roof of a vehicle may be improved.

BRIEF DESCRIPTION OF THE DRAWINGS

Exemplary embodiments of the present disclosure will be described in detail based on the following figures, wherein:

FIG. 4 is a side view showing the sensor mounting structure according to the present exemplary embodiment; and FIG. 5 is a front view showing a left half of the sensor mounting structure according to the present exemplary embodiment.

DETAILED DESCRIPTION

Figure 1:
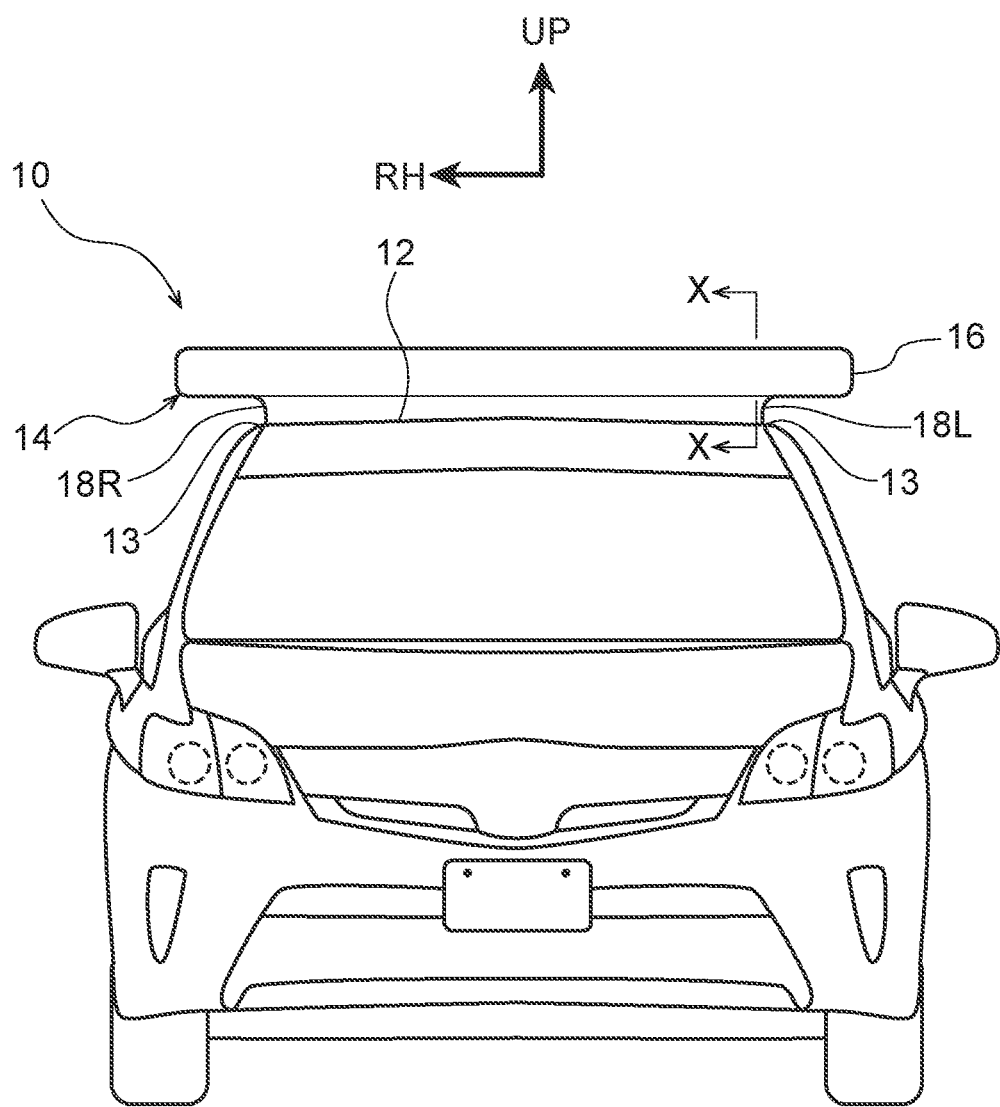
FIG. 1 is a front view showing a self-driving vehicle equipped with a sensor mounting structure according to a present exemplary embodiment.

Below, an exemplary embodiment relating to the present disclosure is described in detail in accordance with the drawings. For convenience of description, the arrow UP that is shown where appropriate in the drawings indicates a vehicle upper direction, the arrow FR indicates a vehicle front direction, and the arrow RH indicates a vehicle right direction. Thus, in the following descriptions, where the directions upper and lower, front and rear, and left and right are recited without being particularly specified, the same represent upper and lower in the vehicle vertical direction, front and rear in the vehicle front-and-rear direction, and left and right in the vehicle left-and-right direction (the vehicle width direction).

A vehicle in which the sensor mounting structure according to the present exemplary embodiment is employed is an autonomous vehicle. However, the vehicle is not limited to being a completely autonomous vehicle that is never driven by a driver. The sensor mounting structure according to the present exemplary embodiment may be employed in a vehicle with autonomous driving functions that can be switched between autonomous driving and manual driving in accordance with conditions. Accordingly, the autonomous vehicle is referred to simply as "the vehicle" below.

As shown in FIG. 1, a sensor unit 14 is mounted at a roof 12 of a vehicle 10. The sensor unit 14 includes a sensor cover 16 that serves as a design cover, which is formed in a shallow, substantially rectangular box shape. In plan view, the sensor cover 16 is formed with a size that does not protrude to outer sides beyond the vehicle 10 at least in the vehicle width direction.

Figure 2:
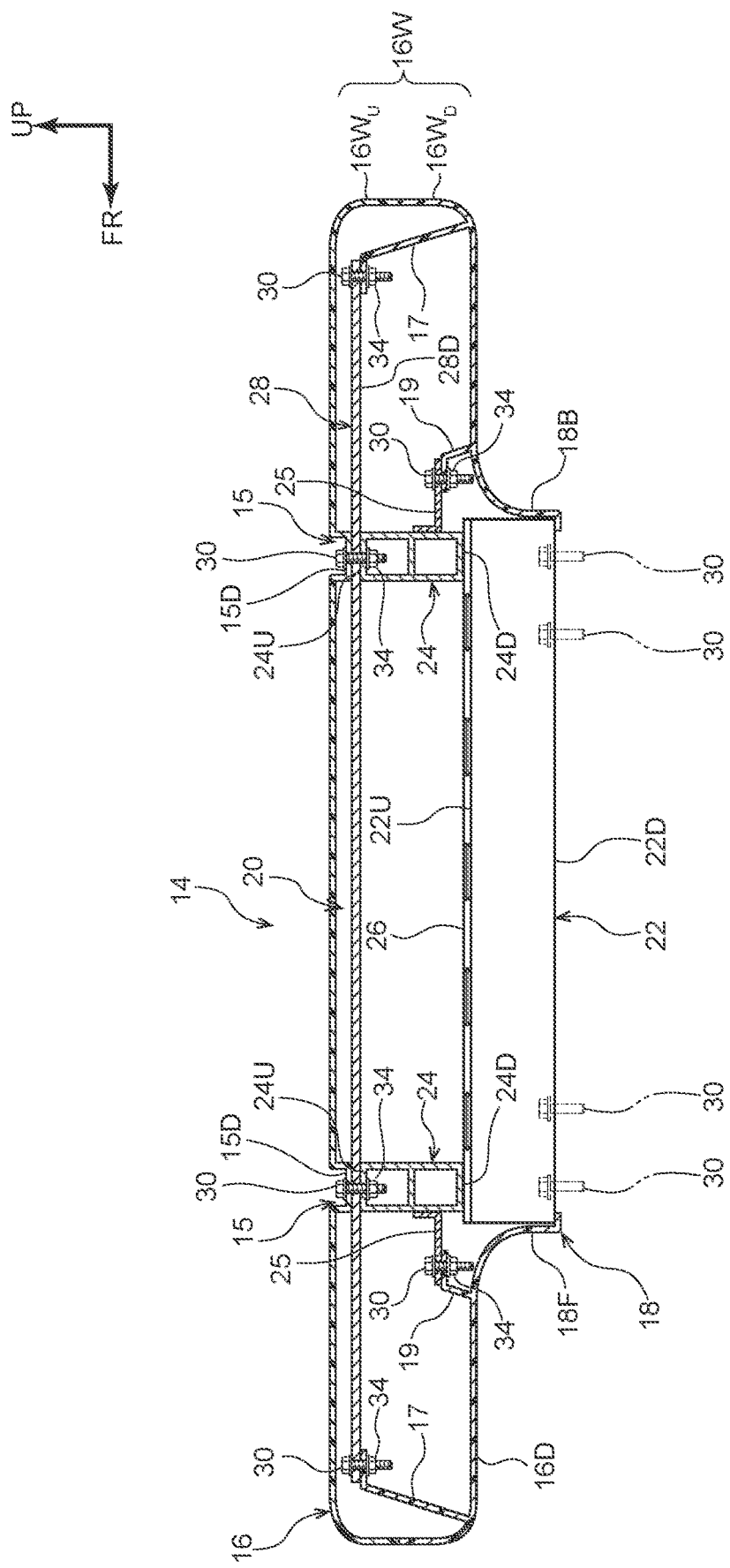
FIG. 2 is a schematic sectional diagram cut along line X-X in FIG. 1.

The sensor cover 16 is formed of a resin material with relatively high stiffness. As shown in FIG. 2, a sensor mounting structure 20 according to the present exemplary embodiment is accommodated inside the sensor cover 16. That is, first mounting members 22, second mounting members 24, a sensor support member 26 and sensor mounting members 28 that constitute the sensor mounting structure 20 are accommodated inside the sensor cover 16.

Figure 3:
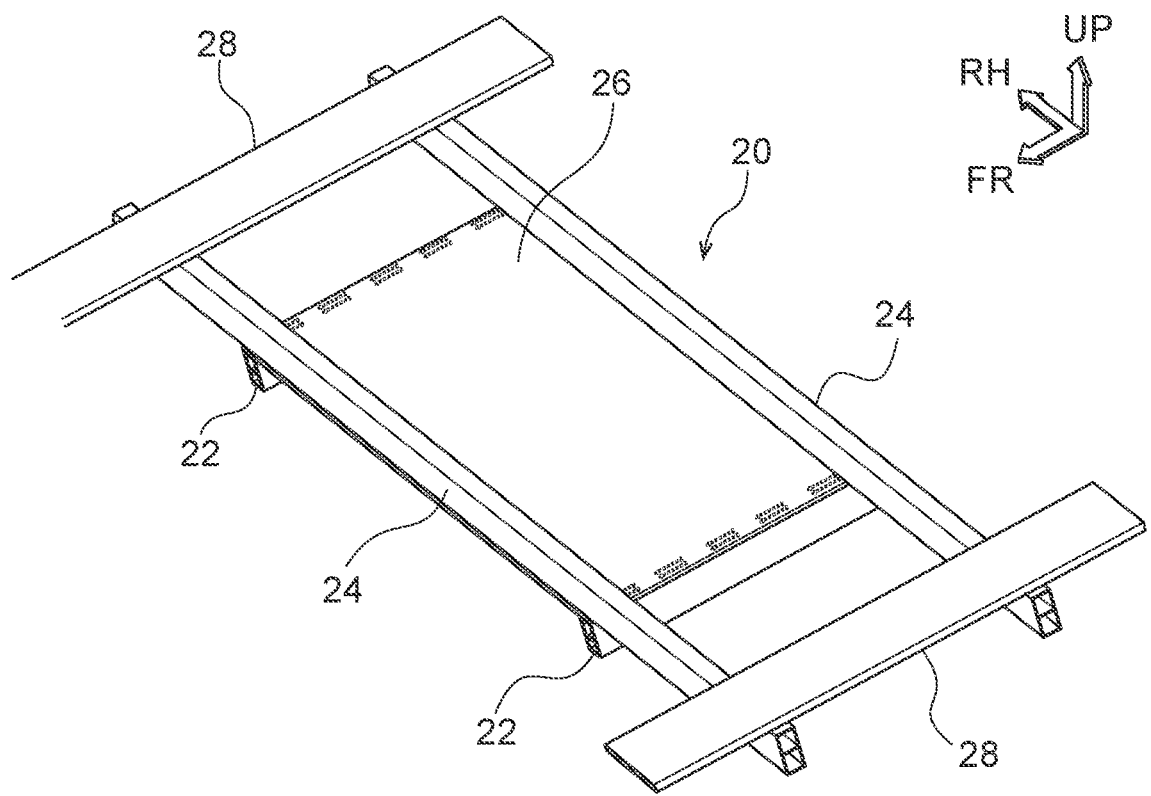
FIG. 3 is a perspective view showing the sensor mounting structure according to the present exemplary embodiment.

As shown in FIG. 3, the first mounting members 22 extend in the vehicle front-and-rear direction, are spaced apart in the vehicle width direction, and are configured to be mountable at arbitrary positions of the roof 12 of the vehicle 10 (see FIG. 1) in the vehicle front-and-rear direction and the vehicle width direction. To describe this more specifically, as shown in FIG. 2 to FIG. 5, a left and right pair of the first mounting members 22 are extruded members formed by extrusion molding of a metal material. Each of the first mounting members 22 is formed in a rectangular closed cross-section shape that substantially forms a figure "8" in cross section. The first mounting members 22 may be specified with arbitrary lengths.

Each first mounting member 22 is provided with respective bolts 30 at both of front-and-rear direction end portions of a lower wall 22D of the first mounting member 22. The bolts 30 are members for fastening to the roof 12 of the vehicle 10, and are provided at positions with front-and-rear symmetry. As shown in FIG. 5, a metal washer 32 is fitted to a head portion side of a shaft portion of each bolt 30. A width (a length in the vehicle width direction) of an upper face of the lower wall 22D of the first mounting member 22 is a little greater than an outer diameter of the metal washer 32.

As shown in FIG. 2, two hole portions (not shown in the drawings) for bolt insertion that are spaced apart in the front-and-rear direction are formed in a front end portion of the lower wall 22D of each first mounting member 22, and two hole portions (not shown in the drawings) for bolt insertion that are spaced apart in the front-and-rear direction are formed in a rear end portion of the lower wall 22D of the first mounting member 22.

Therefore, the first mounting members 22 are fastened and fixed to, for example, floor walls of recess portions (not shown in the drawings) by four each of the bolts 30. The respective recess portions are formed in the vehicle front-and-rear direction in the roof 12 of the vehicle 10, for example, at vehicle width direction inner sides of left and right roof side rails 13 (see FIG. 1).

Depending on a length of the first mounting members 22, when the length of the first mounting members 22 is shorter than a length of the roof 12 in the front-and-rear direction, the first mounting members 22 may be offset and mounted at positions at any of a front end portion, a front-and-rear direction middle portion and a rear end portion of the roof 12. That is, hole portions for bolt insertion may be formed in the floor walls of the recess portions in accordance with the positions at which the sensor unit 14 is to be mounted.

Numbers of the bolts 30 (and the hole portions for bolt insertion) are not limited to the illustrated numbers. One of the bolts 30 or three or more of the bolts 30 may be provided at each of the front-and-rear direction end portions of the lower wall 22D of each first mounting member 22. Furthermore, the bolts 30 (and hole portions for bolt insertion) need not be provided at positions with front-and-rear symmetry in the lower walls 22D of the first mounting members 22.

As shown in FIG. 3, the second mounting members 24 extend in the vehicle width direction, are spaced apart in the vehicle front-and-rear direction, and are configured to be capable of spanning between arbitrary positions in the front-and-rear direction and the vehicle width direction of the first mounting members 22. To describe this more specifically, as shown in FIG. 2 to FIG. 5, a front and rear pair of the second mounting members 24 are also extruded members formed by extrusion molding of a metal material. Each of the second mounting members 24 is formed in a rectangular closed cross-section shape that substantially forms a figure "8" in cross section. The second mounting members 24 may be specified with arbitrary lengths.

The second mounting members 24 are main framework members of the sensor mounting structure 20. Lower walls 24D of the second mounting members 24 shown in the drawings are joined, by welding or the like, and fixed to respective front end portions and rear end portions of upper walls 22U of the first mounting members 22. Actually, as described below, four corners (portions) of the sensor support member 26 are sandwiched between the first mounting members 22 and second mounting members 24. Therefore, the first mounting members 22 and second mounting members 24 are joined together via the four corners (portions) of the sensor support member 26.

The sensor support member 26 is a single panel formed in a rectangular flat plate shape. Various sensors for autonomous driving (not shown in the drawings) may be mounted at an upper face of the sensor support member 26. A length in the front-and-rear direction of the sensor support member 26 shown in the drawings is substantially the same as the length of the first mounting members 22, and a length in the vehicle width direction of the sensor support member 26 is substantially the same as the spacing in the vehicle width direction between the first mounting members 22 (a minimum distance between one of the first mounting members 22 opposing one another in the vehicle width direction and the other of the first mounting members 22) plus the widths (lengths in the vehicle width direction) of the upper walls 22U.

Both of vehicle width direction end portions of a lower face of the sensor support member 26 are joined, by welding or the like, and fixed to the upper faces of the upper walls 22U of the first mounting members 22. Both of front-and-rear direction end portions of the upper face of the sensor support member 26 are joined, by welding or the like, and fixed to the lower faces of the lower walls 24D of the second mounting members 24.

Therefore, the four corners of the sensor support member 26 are fixed in a state of being sandwiched between the first mounting members 22 and the second mounting members 24. Thus, the sensor support member 26 is a structure that is retained by the first mounting members 22 and the second mounting members 24. That is, because the two first mounting members 22 and the two second mounting members 24 are combined in a lattice shape and joined, the sensor mounting structure 20 according to the present exemplary embodiment constitutes a framework structure that is capable of retaining various sensors via the sensor support member 26.

As shown in FIG. 3, the sensor mounting members 28 each extend in the vehicle front-and-rear direction, spanning between respective vehicle width direction end portions (vehicle width direction outer side end portions) of the second mounting members 24. A left and right pair of the sensor mounting members 28 are extruded members formed by extrusion molding of a metal material. As shown in FIG. 5, each sensor mounting member 28 is formed in a rectangular closed cross-section shape that substantially forms a figure "8" in cross section. The sensor mounting members 28 may be specified with arbitrary lengths.

That is, the sensor mounting members 28 shown in the drawings are formed to be longer than the first mounting members 22 and shorter than the second mounting members 24. As shown in FIG. 4 and FIG. 5, a lower face of a lower wall 28D of each sensor mounting member 28 is joined, by welding or the like, and fixed to the upper face of the corresponding vehicle width direction end portion of an upper wall 24U of each second mounting member 24. Various sensors depend from the sensor mounting members 28, but the various sensors are not shown in the drawings.

As shown in FIG. 2, the first mounting members 22, second mounting members 24, sensor support member 26 and sensor mounting members 28 are covered by the sensor cover 16. The sensor cover 16 has a structure in which a height direction substantially central portion of a periphery wall 16W of the sensor cover 16 is a boundary at which the sensor cover 16 can be divided into two parts, an upper part and a lower part. A step portion (not shown in the drawings) is formed at a lower end face of an upper periphery wall 16Wu of the periphery wall 16W, and a step portion (not shown in the drawings) is formed at an upper end face of a lower periphery wall 16Wd. FIG. 2 shows a state in which the step portion of the upper periphery wall 16Wu and the step portion of the lower periphery wall 16Wd are mated with one another and integrated.

A tubular collar portion 18 is integrally formed at a middle portion of a lower wall 16D of the sensor cover 16 so as to extend to the lower side from the lower wall 16D. The collar portion 18 contains and covers front end faces and rear and faces of the first mounting members 22. To describe this more specifically, in plan view the collar portion 18 is formed in a substantially rectangular tube shape that is smaller than the outer profile of the sensor cover 16. A height of the collar portion 18 is substantially the same as the height of the first mounting members 22.

A front wall 18F and rear wall 18B of the collar portion 18 oppose one another in the vehicle front-and-rear direction. A spacing between the front wall 18F and the rear wall 18B is set to be substantially the same as the length of the first mounting members 22. A left side wall 18L and a right side wall 18R of the collar portion 18 oppose one another in the vehicle width direction (see also FIG. 1). A spacing between the left side wall 18L and the right side wall 18R is set to be substantially the same as the spacing in the vehicle width direction between the first mounting members 22 plus the widths of the upper walls 22U.

Thus, the front end faces of the left and right pair of first mounting members 22 are shrouded by the front wall 18F of the collar portion 18 that extends in the vehicle width direction, and the rear end faces of the left and right pair of first mounting members 22 are shrouded by the rear wall 18B of the collar portion 18 that extends in the vehicle width direction. Further, a side wall of the first mounting member 22 at the left side is shrouded by the left side wall 18L of the collar portion 18 that extends in the vehicle front-and-rear direction, and a side wall of the first mounting member 22 at the right side is shrouded by the right side wall 18R of the collar portion 18 that extends in the vehicle front-and-rear direction.

The sensor cover 16 is fixed by fastening to the second mounting members 24 and the sensor mounting members 28. That is, left and right pairs of brackets 17 that respectively extend to the upper side are integrally provided at an inner face of the lower wall 16D of the sensor cover 16, at front end portions and rear end portions of the inner face. An upper end portion of each bracket 17 is curved to the horizontal. Respective hole portions for bolt insertion (not shown in the drawings) are formed in the upper end portions of the brackets 17.

Hole portions for bolt insertion (not shown in the drawings) are also formed in front end portions and rear end portions of the sensor mounting members 28. Thus, the upper end portions of the brackets 17 are fastened and fixed to the lower faces of the front end portions and rear end portions of the sensor mounting members 28 by respective the bolts 30 and nuts 34.

Left and right pairs of brackets 19 that respectively extend to the upper side are also integrally provided at the inner face of the lower wall 16D of the sensor cover 16, in vicinities of the collar portion 18. An upper end portion of each bracket 19 is curved to the horizontal. Respective hole portions for bolt insertion (not shown in the drawings) are formed in the upper end portions of the brackets 19.

Left and right pairs of brackets 25 that extend to the front side or the rear side are integrally provided at, respectively, the front end face of the second mounting member 24 at the front side and the rear end face of the second mounting member 24 at the rear side. Hole portions for bolt insertion (not shown in the drawings) are formed in, respectively, a front end portion or rear end portion of each bracket 25.

Accordingly, at the second mounting member 24 at the front side, upper end portions of the brackets 19 and front end portions of the brackets 25 are superposed with one another and are respectively fastened and fixed by the bolts 30 and nuts 34. Similarly, at the second mounting member 24 at the rear side, upper end portions of the brackets 19 and rear end portions of the brackets 25 are superposed with one another and are respectively fastened and fixed by the bolts 30 and nuts 34.

Accordingly, first the lower part side of the sensor cover 16 divided into the two parts is mounted to the roof 12 of the vehicle 10 together with the first mounting members 22, second mounting members 24, sensor support member 26 and sensor mounting members 28 constituting the sensor mounting structure 20. Subsequently, the upper part side of the sensor cover 16 divided into the two parts is put over the sensor mounting structure 20 so as to shroud the sensor mounting structure 20 and is mounted.

That is, recessed groove portions 15 with a predetermined depth are integrally formed along the vehicle width direction in the upper part side of the sensor cover 16. The recessed groove portions 15 are spaced apart in the front-and-rear direction and are formed so as to oppose the upper walls 24U of the second mounting members 24 in the vertical direction. Respective hole portions for bolt insertion (not shown in the drawings) are formed in floor walls 15D of the recessed groove portions 15. Respective hole portions for bolt insertion (not shown in the drawings) are also formed in the upper walls 24U of the second mounting members 24.

Thus, the floor walls 15D of the recessed groove portions 15 are superposed with the upper walls 24U of the second mounting members 24, and the superposed floor walls 15D of the recessed groove portions 15 and upper walls 24U of the second mounting members 24 are respectively fastened and fixed by the bolts 30 and nuts 34. In this way, the upper part side of the sensor cover 16 is attached to the lower part side of the sensor cover 16.

That is, the sensor mounting structure 20 is covered by the sensor cover 16 that is configured by the upper and lower two parts. Numbers of the bolts 30 (and hole portions for bolt insertion) in the recessed groove portions 15 are not particularly limited. However, in some embodiments, at least two of the bolts 30, spaced apart in the vehicle width direction, are provided in each recessed groove portion 15.

Now, operation of the sensor mounting structure 20 according to the present exemplary embodiment with the structure described above is described.

As described above, the sensor mounting structure 20 according to the present exemplary embodiment is configured by the left and right pair of first mounting members 22 and the front and rear pair of second mounting members 24 being combined in a lattice shape and joined, and the sensor support member 26 being retained by the first mounting members 22 and second mounting members 24 that have been combined in the lattice shape and joined. The respective sensor mounting members 28 span between the two vehicle width direction end portions of the respective second mounting members 24.

Because the first mounting members 22 and second mounting members 24 are all extruded members that are formed by extrusion molding, the respective lengths of the first mounting members 22 and second mounting members 24 may be arbitrarily specified. Therefore, the lengths of the first mounting members 22 and second mounting members 24 may be specified in advance and prepared in accordance with the size and shape of the roof 12 of the vehicle 10.

The spacing between the first mounting members 22 and the positions of the hole portions for bolt insertion that are formed in the lower walls 22D of the first mounting members 22 may also be specified arbitrarily. Therefore, the left and right pair of first mounting members 22 may be mounted at arbitrary positions in the vehicle front-and-rear direction and the vehicle width direction of the roof 12 of the vehicle 10.

The spacing between the second mounting members 24 and positions of welding of the lower walls 24D of the second mounting members 24 to the upper walls 22U of the first mounting members 22 may also be specified arbitrarily. Therefore, the front and rear pair of second mounting members 24 may span between arbitrary positions of the left and right pair of first mounting members 22 in the front-and-rear direction and the vehicle width direction.

Thus, an overall size of the sensor mounting structure 20 according to the present exemplary embodiment may be set to an arbitrary size. Therefore, even if the size of the roof 12 of the vehicle 10 is changed due to a change of model or the like, or a layout in which the various sensors are arranged is changed and the size of the sensor support member 26 is changed due to a change in sizes, quantity or the like of the various sensors, flexible adaptation is possible simply by changing the combination of spacings and the like of the first mounting members 22 and second mounting members 24 and preparing the sensor cover 16 in a suitable size.

That is, according to the sensor mounting structure 20 according to the present exemplary embodiment, the overall length and overall width (a width not exceeding the vehicle width of the vehicle 10) of the sensor unit 14 may be specified in accordance with a change in the size of the roof 12 of the vehicle 10, a change in the layout in which the various sensors are arranged, and the like. Therefore, versatility when various sensors are to be mounted at the roof 12 of the vehicle 10 may be improved. Plural anticipated sizes of the sensor cover 16 may be prepared in advance and the sensor cover 16 may be fabricated to suit the size of the sensor mounting structure 20.

The first mounting members 22 and the second mounting members 24 are all formed in closed cross-section shapes in cross section. Therefore, stiffness for retention of the sensor support member 26 by the first mounting members 22 and second mounting members 24 may be more assured than in a structure in which the first mounting members 22 and second mounting members 24 are not all formed in closed cross-section shapes. Furthermore, because the four corners of the sensor support member 26 are sandwiched by the first mounting members 22 and second mounting members 24, the sensor support member 26 may be securely retained by the first mounting members 22 and second mounting members 24.

The sensor mounting members 28 span between the respective two vehicle width direction end portions of the second mounting members 24. Therefore, even if the quantity of the various sensors increases to an extent such that mounting space at the sensor support member 26 alone is insufficient, flexible adaptation is possible. Because the sensor mounting members 28 are also formed in closed cross-section shapes in cross section, stiffness for support of the various sensors by the sensor mounting members 28 may be more assured than in a structure in which the sensor mounting members 28 are not formed in closed cross-section shapes.

Above, the sensor mounting structure 20 of the vehicle 10 according to the present exemplary embodiment is described in accordance with the attached drawings. However, the sensor mounting structure 20 according to the present exemplary embodiment is not limited to the illustrated structures; suitable design modifications may be applied within a scope not departing from the gist of the present disclosure.

For example, the sensor support member 26 is not limited to a structure formed in the illustrated size and shape (the rectangular flat plate shape). Further, the first mounting members 22, second mounting members 24 and sensor mounting members 28 are not limited to structures that are respectively formed in closed cross-section shapes but may be formed in, for example, substantial hat shapes in cross section.

Depending on sizes, quantity and the like of the various sensors, structures are possible in which the sensor mounting members 28 are not provided. Further, structures are possible in which only the sensor mounting members 28 are provided and the sensor support member 26 is not provided. Further, the sensor mounting members 28 are not limited to structures that span between the respective vehicle width direction end portions of the second mounting members 24. Structures are possible in which only the sensor mounting member 28 at one of left or right spans between the vehicle width direction outer side end portions of the second mounting members 24.

What is claimed is:

1. A sensor mounting structure for a vehicle, comprising:
   first mounting members extending in a vehicle front-and-rear direction, being separated by a spacing in a vehicle width direction, and being mountable at arbitrary positions of a roof of the vehicle; and
   second mounting members extending in the vehicle width direction, being separated by a spacing in the vehicle front-and-rear direction, and being configured to span between arbitrary positions of the first mounting members, the second mounting members and the first mounting members retaining a sensor support member, wherein:
   the sensor support member is formed in a rectangular flat plate shape, and
   a portion of the sensor support member is sandwiched by the first mounting members and second mounting members.

2. The sensor mounting structure for a vehicle according to claim 1, wherein the first mounting members and second mounting members have closed cross-section shapes.

3. The sensor mounting structure for a vehicle according to claim 1, further comprising a sensor mounting member extending in the vehicle front-and-rear direction and spanning between vehicle width direction outer side end portions of the second mounting members.

4. The sensor mounting structure for a vehicle according to claim 3, wherein the sensor mounting member has a closed cross-section shape.

5. The sensor mounting structure for a vehicle according to claim 1, wherein a pair of the first mounting members are arranged in the vehicle width direction.

6. The sensor mounting structure for a vehicle according to claim 1, wherein a pair of the second mounting members are arranged in the vehicle front-and-rear direction.

7. The sensor mounting structure for a vehicle according to claim 1, wherein both vehicle width direction end portions of a lower face of the sensor support member are joined and fixed to upper faces of the first mounting members, and both front-and-rear direction end portions of an upper face of the sensor support member are joined and fixed to lower faces of the second mounting members.

8. A sensor mounting structure for a vehicle, comprising:
   first mounting members extending in a vehicle front-and-rear direction, being separated by a spacing in a vehicle width direction, and being mountable at arbitrary positions of a roof of the vehicle; and
   second mounting members extending in the vehicle width direction, being separated by a spacing in the vehicle front-and-rear direction, and being configured to span between arbitrary positions of the first mounting members, the second mounting members and the first mounting members retaining a sensor support member,
   wherein the second mounting members are positioned above the first mounting members in a vehicle vertical direction.

9. A sensor mounting structure for a vehicle, comprising:
   first mounting members extending in a vehicle front-and-rear direction, being separated by a spacing in a vehicle width direction, and being mountable at arbitrary positions of a roof of the vehicle; and
   second mounting members extending in the vehicle width direction, being separated by a spacing in the vehicle front-and-rear direction, and being configured to span between arbitrary positions of the first mounting members, the second mounting members and the first mounting members retaining a sensor support member,
   wherein the first mounting members and the second mounting members are positioned above a roof of the vehicle in a vehicle vertical direction.

* * * * *